July 27, 1965   F. B. KENNELL   3,197,734
BURGLAR AND PERSONAL PROTECTION ALARM FOR VEHICLES
Filed Aug. 29, 1962

Franklin B. Kennell
INVENTOR.

United States Patent Office 3,197,734
Patented July 27, 1965

3,197,734
BURGLAR AND PERSONAL PROTECTION
ALARM FOR VEHICLES
Franklin B. Kennell, 151 Northern Blvd., Riverhead, N.Y.
Filed Aug. 29, 1962, Ser. No. 220,168
7 Claims. (Cl. 340—65)

This invention relates to an alarm system for automotive vehicles and more particularly, to an alarm system which is most useful in connection with unlawful or forcible entry into the vehicle and for the personal protection of the vehicle operator while within the vehicle against assault or the threat of bodily injury.

The alarm system of the present invention therefor represents an improvement over the burglar alarm system as disclosed in my prior Patent No. 2,984,820, issued May 16, 1961. In the aforesaid patent the disclosed alarm system was selectively placed in an alert condition upon leaving the automotive vehicle so that a warning signal could be issued by the existing signal providing devices of the vehicle such as the vehicle horn, tail lights and headlights. Once the alarm circuit was placed in its alert condition, an inertia responsive switch device capable of detecting attempts at forcible entry into the vehicle, was operative to set the alarm circuit and signal indicating devices into operation in an intermittent manner so as to provide the warning signal. The warning operation of the alarm circuit was however operative for a pre-determined duration of time and also required selective closing of switches in order to place it in its alert conditions. In this manner, operation of the alarm system could be prevented when not desired, as for example during the operation of the vehicle by the vehicle operator when the inertia responsive switch device would trigger operation of the signal indicating devices. However, in accordance with the principles of the present invention, the alarm circuit as disclosed in the aforementioned patent, has been modified so that it may be available to produce the warning alert by means of the horn or by the vehicle lights upon selective actuation of a dashboard mounted button, rendering the alarm circuit operative for an indefinite period of time as a personal protection measure.

The personal protection alarm provisions of the present invention further features as an additional object, a special key controlled reset switch by means of which the personal protection operation of the alarm circuit may be stopped only by use of a special key to thereby prevent unauthorized disabling of the alarm circuit once set into operation for personal protection purposes.

A still further object and feature of the present invention involves the illumination of the vehicle dome light simulaneously with operation of the alarm circuit when being operated for personal protection purposes as distinguished from its burglar alarm operation, thereby providing an additional deterent and a measure of protection for the person in connection with the personal protection operation of the alarm circuit.

These together with other objects and advantages which will become subsequently apparent resides in the details of construction and operation as more fully hereinafter described and claimed, reference being had to the accompanying drawings forming a part hereof, wherein like numerals refer to like parts throughout, and in which:

Figure 1:
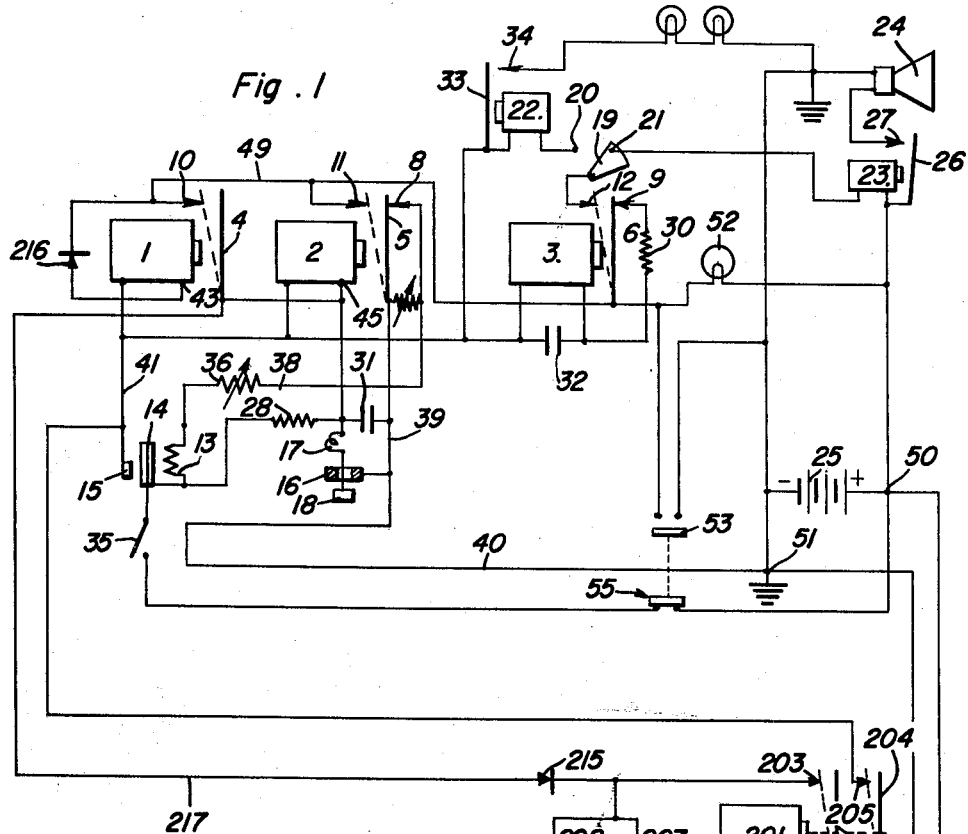
FIGURE 1 is an electrical circuit diagram of the alarm circuit of the present invention.

Referring now to FIGURE 1, the alarm circuit of the present invention which incorporates for the most part, the alarm circuit as disclosed in the afore-mentioned Patent No. 2,984,820, includes a battery source of potential 25 which may be the vehicle battery having a positive terminal 50 and a grounded negative terminal 51. Connected across the battery 25 upon closing of the normally closed switch 53, is the vehicle dome light 52. It will be appreciated that the dome light will be lit or energized upon opening of the vehicle door in a well-known manner to those skilled in the art. Thus, when the vehicle doors are closed, the switch 53 will be opened simultaneously with the closing of the normally opened switch 55 so as to extinguish the internal dome light 52. Also connected in parallel with the dome light 52 across the battery 25, and through the relay switch 6 when in its dotted line position, is the horn relay coil 23 operative when energized, to close the relay switch 26 establishing an energizing circuit through the usual vehicle signal indicating horn device 24. Alternately, a signal indicating circuit may be established upon repositioning of the selective switch 19, from contact with the contact 21 to contact with the contact 20, through the signal lamp relay coil 22 to thereby actuate the relay switch 33 engaging the contact 34 in order to energize head lamps and tail lights. Thus, the switch device 19 will determine which of the usual vehicle signal indicating devices are to be used in connection with the warning alarm.

Upon closing of the switch 55 as herein before mentioned, and closing of the dashboard mounted conditioning switch 35 in series therewith, an electrical connection may be established from the battery terminal 50, through the heater filament 13, the adjustable resistor 36 in series therewith, the conductor 38 and through contact 8 of relay switch 5, the relay switch 5 being connected by the conductor 39 and 40 to the negative terminal 51 of the battery. Also connected in parallel with the heater filament circuit, is the resistor 28 and capacitor 31 in series therewith. Also, upon opening of the heater filament circuit by actuation of the relay switch 5 to its dotted line position, an alternate circuit for the heater filament will be established through the adjustable resistor connected between the conductors 38 and 39, by passing the relay switch 5. Also by passing the capacitor 31, is an inertia responsive switch device which includes a conductive wire 17 to which the weight member 18 is connected, said wire 17 extending through a conductive ring 16 conductively connected to the conductor 39.

A thermal responsive timing switch device including the bimetallic strip 14 is heated by means of the heater filament 13, and is adapted to engage the switch contact 15 in order to establish a conductive path from the positive terminal 50 of the battery and through the switches 55 and 35, to each of the relay coil devices 1, 2, and 3. The terminal 43 of the relay coil 1 constituting a holding relay, is connected by the current rectifying diode 216 to the line 49 and to the relay switch contact 10 which is engaged by the relay switch 4 when the relay coil 1 is energized. The line 49 is also connected to the relay contact 11 engaged by the relay switch 5 when the signal relay coil 2 is energized. The terminal 45 of the relay coil 2 is connected to the relay switch 4 and to the wire 17 of the inertia responsive sensor switch device. Also, the line 49 is connected to the relay switch 6 and the dome light 52. The relay coil 3 constitutes part of an intermittent energizing circuit which includes the relay switch 6 operative to oscillate between the relay switch contacts 9 and 12 in response to energization and de-energization of the relay coil 3. The connection to the positive terminal of the battery established upon closing of the thermal switch 14–15 extends by means of the conductor 41 to one terminal of the relay coil 3 and one side of the capacitor 32, the other side of which is connected to the other terminal of the relay coil 3 and to the resistor 30 completing a circuit through the contact 9 and the relay switch 6 to the negative terminal of the battery when the line 49 is connected by the relay switch 5 and conductors 39 and 40 to the negative terminal. Charging of the capacitor 32 may thereby occur followed by energization of the relay coil actuating the relay switch 6 so as to open the circuit for deenergizing the relay coil after discharge of the capacitor 32. Intermittent operation of the vehicle signal indicating devices is thereby achieved.

The battery 25 is also connected to the relay coil 201 by means of a conductor between the positive terminal 50 thereof and the terminal 213 of the relay coil. Also connected to the positive terminal of the battery, is a by-pass relay switch 204 associated with the relay coil 201. The relay coil 201 also has asociated therewith a relay holding switch 202. Accordingly, upon energization of the relay coil 201, the relay contacts 203 and 205 are respectively engaged by the relay switches 202 and 204. An energizing circuit through the relay coil 201 is however completed only when the switch contacts 209 and 210 are engaged so as to establish a conductive connection from the other terminal 212 of the relay coil 201 to the negative terminal 51 of the battery. Thus, when the relay holding switch 202 is closed upon energization of the relay coil, a relay holding circuit is established through the normally closed reset switch 206 connected to the relay terminal 212 by passing the switch 209-210 in order to hold the relay 201 energized for an indefinite period of time after opening of the switch contacts 209 and 210. The relay switch 204 on the other hand, establishes a conductive path from the positive terminal 50 of the battery directly to the conductor 41 connected to the relay coils 1, 2, and 3 in parallel with the series connected door switch 55, conditioning switch 35 and thermal switch contacts 14 and 15 as hereinbefore described. Thus, the connection so established, bypasses the thermal responsive switch 14-15 so as to render the alarm circuit operative for an indefinite period and regardless of the condition of the switch devices 35, 55. The ground connection established by closing of the inertia responsive signal switch device 16-17-18 is also by-passed by closing of the relay holding switch 202. It will also be observed that the internal dome light 52 is connected by means of the line 49 and the closed relay switch 4 to the conductor 217 and through the current rectifying diode 215, to the relay contact 203 associated with the relay holding switch 202. In this manner, an energizing circuit is completed through the dome light 52 when the alarm circuit is operated by energization of the relay 201.

Figure 2:
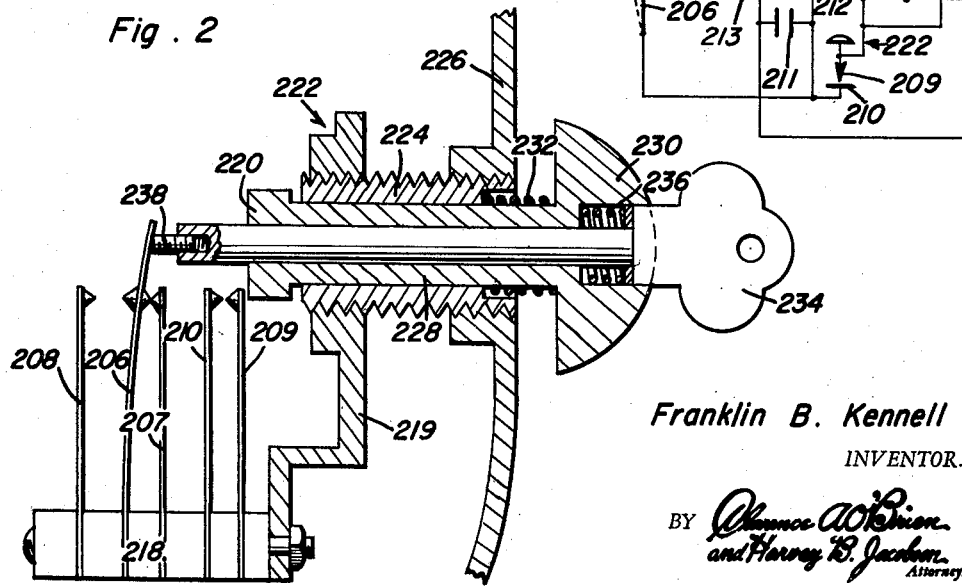
FIGURE 2 is a side sectional view of a selective alarm control device associated with the alarm system.

The reset switch 206 may be displaced to its dotted line position out of contact with the switch terminal 207 with which it is normally engaged, in order to disable the alarm circuit previously rendered operative upon closing of the signal switch 209-210. It is essential, however, that displacement of the reset switch 206 be sufficient only to come out of contact with the switch terminal 207 without engaging the over travel contact terminal 208. Also, connected across the terminals 212 and 213 of the relay coil 201, is a capacitor 211 which is charged during the energization of the relay coil 201 and will be operative to discharge upon opening of the reset switch 206 so as to temporarily maintain the relay coil energized. Accordingly, it is essential that the reset switch 206 be held in its open condition for a pre-determined period of time before deenergization of the relay coil 201 occurs so as to disable the alarm circuit previously set into operation. Referring therefore to FIGURE 2, the selective alarm switch structure 222 is shown which includes the mounting of a mounting sleeve 224 in the dashboard 226 of the automotive vehicle, the mounting sleeve 224 projecting axially rearwardly therefrom in enclosed relation to the dashboard. Threadably mounted at one axial end of the mounting sleeve 224 is a switch mounting bracket 219 to which is secured the insulating switch spacer assembly 218. Secured to the switch spacing assembly 218, are the normally opened signal switch contacts 209 and 210. Also mounted on the bracket 219 in spaced relation to the signal switch contacts 209 and 210, is the normally closed reset switch 206 engaged with contact 207. Mounted adjacent to the reset switch 206 is the over travel contact 208. A slidable actuator 228 is therefore mounted within mounting sleeve 224 having at one axial end thereof, a collar 220 adapted to momentarily engage and close the switch contacts 209 and 210 in order to set the alarm system into operation as a personal protection measure upon actuation of the button formation 230 formed at the opposite end of the actuator 228 and disposed in front of the dashboard 226. Accordingly, the spring 232 may be provided for holding the switch actuator 228 in an extended condition out of contact with the switch contact 209.

For the purpose of stopping personal protection operation of the alarm circuit, an axial bore is formed within the switch actuator 228 for receiving a key member 234 of a predetermined length. Accordingly, the inner axial end of the key member is provided with a non-conductive tip 238 adapted to engage and displace the reset switch 206 upon displacement of the key 234 against the bias of the spring 236 which is necessarily lighter than the spring 232. Displacement of the key when the actuator 228 is held in its extended condition, will thereby be operative to bring the reset switch 206 out of contact with the contact 207 without engaging the over travel contact 208. Holding the reset switch 206 in its opened condition for a pre-determined period of time necessary to permit discharge of the capacitor 211, will then effect de-energization of the relay 201 in order to disable the alarm circuit. Withdrawal of the key 234 thereafter, will restore the alarm circuit to its initial condition prior to actuation of the button 230. It will therefore be appreciated, that to stop operation of the alarm circuit, the key 234 must be of a pre-determined length and must be held in the depressed condition without depressing the button 230, for a pre-determined time interval. In this manner, unauthorized stopping of the alarm circuit will be prevented.

From the foregoing description, the operation and utility of the alarm circuit system of the present invention will be apparent. The alarm circuit will operate in connection with forcible entry of the vehicle after the vehicle operator closes the alert conditioning switch 35. Upon closing of the vehicle doors, the switch 55 will also close so as to establish a circuit through the filament heater 13. After a delay period, predetermined by the filament heater resistance and the resistance of the resistor 36, the thermal switch 14-15 will close establishing connections to the relay coils 1, 2, and 3. Also, the capacitor 31 will be charged to battery voltage so as to prevent further increase in the heating current through the heater element. The alarm circuit is thereby placed in an alert condition.

In response to jarring of the vehicle caused by an attempt at forcible entry, the inertia responsive signal switch 16 will be closed to momentarily establish an energizing circuit through the signal responsive relay 2 and discharging the capacitor 31 which is thereafter recharged by energizing current through the relay 2, the impedance of which is less than that of the resistor 28. The relay switch 5 is thereby actuated to open the original heater circuit and re-establish a heater circuit through the adjustable resistor 39 at a reduced current to gradually cool the heater in order to reopen the switch 14-15 after a pre-determined alarm period. Also, the relay switch 5 establishes through the contact 11 a connection from the negative terminal 51 to the line 49 so as to complete an energizing circuit through the holding relay coil 1. Upon energization of the holding relay 1, relay switch 4 is closed so as to provide a connection from the relay terminals 43 and 45 to the negative terminal 51, by passing the inertia responsive switch 16 and capacitor 31 so as to hold the relays energized after opening of the inertia responsive switch 16 for the alarm period duration. During the alarm period, the capacitor 32 connected across the relay 3 is charged by the circuit established from the positive terminal 50 through the switches 55, 35, 14–15 and line 41 to the capacitor 32 and from the capacitor 32 to the negative terminal 51 through the resistor 30, relay switch 6 and line 49 connected by the relay switches 4 and 5 and lines 39 and 40. The load of resistor 30 however, prevents the dome light from lighting. When the capacitor is charged, relay 3 is energized by the current path established therethrough and discharge current from the capacitor after actuation of the relay switch disconnecting the relay 3 from the battery, until the capacitor 32 is fully discharged to then de-energize the relay. Thus, intermittent actuation of the relay switch is operative to establish intermittent energizing circuits to the horn relay 23 and/or the light relay 22 dependent upon the selective position of the switch 19. After a pre-determined alarm period, the switch 14–15 opens to stop operation although the alert condition of the alarm circuit will then be re-established as long as the switches 35 and 55 remain closed.

Whether or not the switches 35 and 55 are closed or opened, upon depression of the dash mounted button 230, against the bias of the spring 232, collar 220 closes the switch contact 209 and 210 so as to establish a conductive path from the grounded battery terminal 51 to the relay terminal 212 of the relay 201 for energization thereof, thereby closing the relay switches 202 and 204. Upon closing of the holding relay switch 202, a by pass connection to the battery terminal 51 is established through the contacts 207 and switch 206 to the relay terminal 212 to hold the relay energized after opening of the switch 209–210 on release of the button 230. Upon closing of the relay switch 204, the positive terminal 50 of the battery is connected to line 41, by passing the thermal responsive switch 14–15 to set the alarm circuit into operation without any time limitation as associated with the closing of the thermal switch 14–15. Also, since the dome light 52 is connected by the line 49 to the line 217 and through diode 215 to the switch contact 203, it will be illuminated during the alarm operation.

To stop the alarm, special key 234 is inserted through the button 230 in its extended condition and depressed against the bias of the spring 236 so that the insulated tip 238 opens the reset switch 206. The reset switch 206 must be held open for a sufficient period until the capacitor 211 is fully discharged so that the relay 201 may be de-energized. If the key is too long, the reset switch engages the over-travel contact 208 so as to prevent disabling of the alarm circuit or if the key is not held in long enough or depressed too hard so as to push the button 230 inwardly, the alarm circuit will not be stopped. When the alarm is stopped however, the key 234 may then be released or withdrawn whereupon the alarm circuit will be restored to its alert condition or its initial condition whatever it may be.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An alarm system for vehicles having internal indicating means rendered operative upon entry into the vehicle and intermittently operative energizing means providing an alarm signal for a limited duration of time, selectively controlled conditioning means operatively connected to said energizing means for placing thereof in an alert condition, inertia responsive detecting means operatively connected to the conditioning means and the energizing means to render the energizing means operative in response to attempted entry into the vehicle when the energizing means is in said alert condition, vehicle mounted actuating means operatively connected to the energizing means and the indicating means for simultaneous operation thereof for an indefinite duration of time, selectively actuated key means insertable through said actuating means to stop operation of the energizing means and the indicating means, and reset means operatively connected to the actuating means and responsive to withdrawal of the key means from the actuating means for restoring said energizing means to said alert condition.

2. In a burglar and personal protection alarm system for a vehicle, a selective alarm control device comprising, a mounting sleeve adapted to be secured to the dashboard of said vehicle, a switch mounting bracket secured to one end of said mounting sleeve, a normally opened signal switch mounted in fixed relation on said mounting bracket, a normally closed reset switch mounted on said bracket in spaced relation to said signal switch to stop operation of the alarm system when opened, over-travel contact means mounted on said bracket adjacent to said reset switch for shunting thereof when actuated, a signal switch actuator slidably mounted by said mounting sleeve and having a collar at one end displaceable for closing said signal switch and a button formation at an opposite end for slidable displacement of the collar, and key receiving means in said signal switch actuator for slidably receiving a key of pre-determined length for opening the reset switch without actuating the over-travel contact means in order to stop operation of the alarm system.

3. In combination with an alarm circuit having a conditioning switch selectively actuated to an alarm alert position for rendering the alarm circuit operative when triggered by closing of a sensor switch, a personal protection circuit operatively connected to said alarm circuit comprising, selectively actuated switch means displaceable by two fixed distances for respectively triggering the alarm circuit and terminating operation thereof, relay means operatively connected to said switch means for energization in response to displacement of the switch means by one of said fixed distances, by-pass means operatively connected to the alarm circuit in by-pass relation to the conditioning switch and the sensor switch for triggering the alarm circuit in response to energization of said relay means, relay holding means operatively connecting the alarm circuit to the relay means for maintaining energization thereof in response to said triggering of the alarm circuit, reset means operatively connecting said switch means to the relay holding means for deenergizing the relay means in response to displacement of the switch means by said other fixed distance, whereby operation of the alarm circuit is terminated and over-travel means operatively connected to the switch means and the relay means for maintaining energization of the relay means in response to displacement of the switch means beyond said other fixed distance, whereby unauthorized stoppage in operation of the alarm circuit is prevented.

4. The combination of claim 3 wherein said over-travel means comprises, capacitor means operatively connected to the relay means to prolong energization thereof for a delay period upon opening of the relay holding means by the reset means, and limit contact means engageable by the switch means and operatively connected to the relay holding means for reenergizing the relay means during said delay period.

5. The combination of claim 4 wherein said selectively actuated switch means comprises, a slide mounting member, a contact mounting bracket fixed to said slide mounting member, an actuator member slidably mounted by the mounting member for movement relative thereto by said one of the fixed distances, normally open contact means mounted on the bracket for engagement by the actuator member to effect energization of said relay means, an actuator element, a switch element mounted by said bracket for actuation by the actuator element to alternatively engage the reset means and the over-travel means, means mounting said actuator element within the actuator member for displacement relative thereto by an amount which added to said one of the fixed distances equals the other of said fixed distances, and means biasing the actuator member and the actuator element to positions wherein the switch element is engaged with the reset means and the contact means is opened.

6. The combination of claim 3 wherein said selectively actuated switch means comprises, a slide mounting member, a contact mounting bracket fixed to said slide mounting member, an actuator member slidably mounted by the mounting member for movement relative thereto by said one of the fixed distances, normally open contact means mounted on the bracket for engagement by the actuator member to effect energization of said relay means, an actuator element, a switch element mounted by said bracket for actuation by the actuator element to alternatively engage the reset means and the over-travel means, means mounting said actuator element within the actuator member for displacement relative thereto by an amount which added to said one of the fixed distances equals the other of said fixed distances, and means biasing the actuator member and the actuator element to positions wherein the switch element is engaged with the reset means and the contact means is opened.

7. In combination with an alarm circuit having a sensor switch for triggering operation for a limited period predetermined by a timing switch in the alarm circuit, a personal protection circuit operatively connected to said alarm circuit, comprising, selectively actuated switch means displaceable by two fixed distances for respectively triggering the alarm circuit for operation thereof for an indefinite period and terminating operation, relay means operatively connected to said siwtch means for energization in response to displacement of the switch means by one of said fixed distances, by-pass means operatively connected to the alarm circuit in by-pass relation to the timing switch and the sensor switch for triggering the alarm circuit in response to energization of said relay means, relay holding means operatively connecting the alarm circuit to the relay means for maintaining energization thereof in response to said triggering of the alarm circuit, reset means operatively connecting said switch means to the relay holding means for deenergizing the relay means in response to displacement of the switch means by said other fixed distance, whereby operation of the alarm circuit is terminated, and over-travel means operatively connected to the switch means and the relay means for maintaining energization of the relay means in response to displacement of the switch means beyond said other fixed distance, whereby unauthorized stoppage in operation of the alarm circuit is prevented.

References Cited by the Examiner

UNITED STATES PATENTS

| | | | |
|---|---|---|---|
| 2,594,196 | 4/52 | Moledzky | 340—63 |
| 2,984,820 | 5/61 | Kennell | 340—65 |

NEIL C. READ, *Primary Examiner.*